Nov. 2, 1965        H. M. GUINOT        3,215,736
PREPARATION OF AMINO ACIDS
Filed March 20, 1964        2 Sheets-Sheet 1
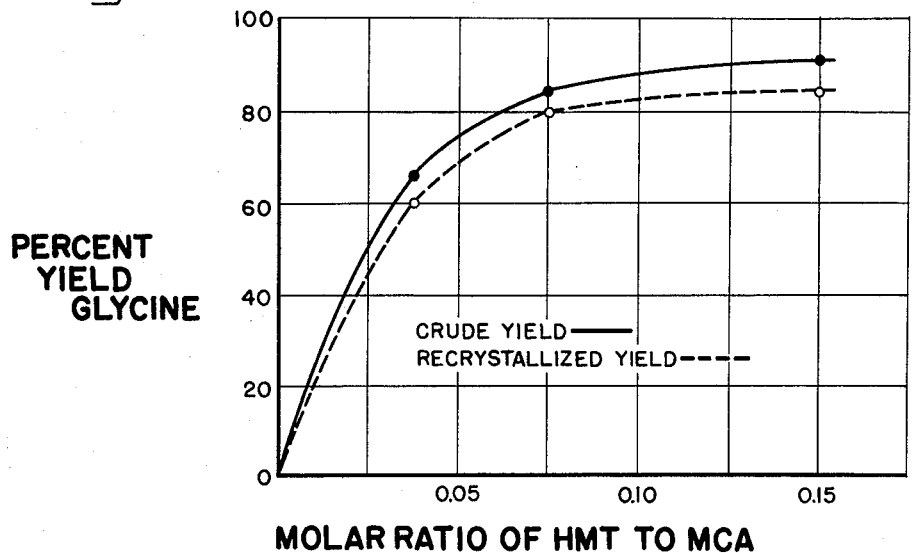
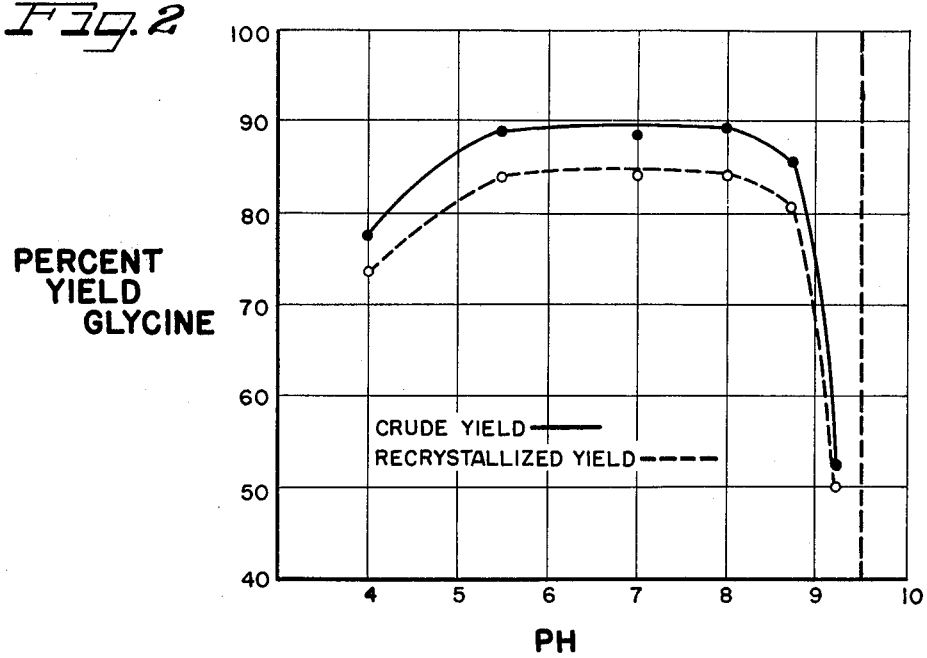
INVENTOR.
Henri M. Guinot
BY
Hill, Sherman, Meroni, Gross & Simpson
ATTORNEYS

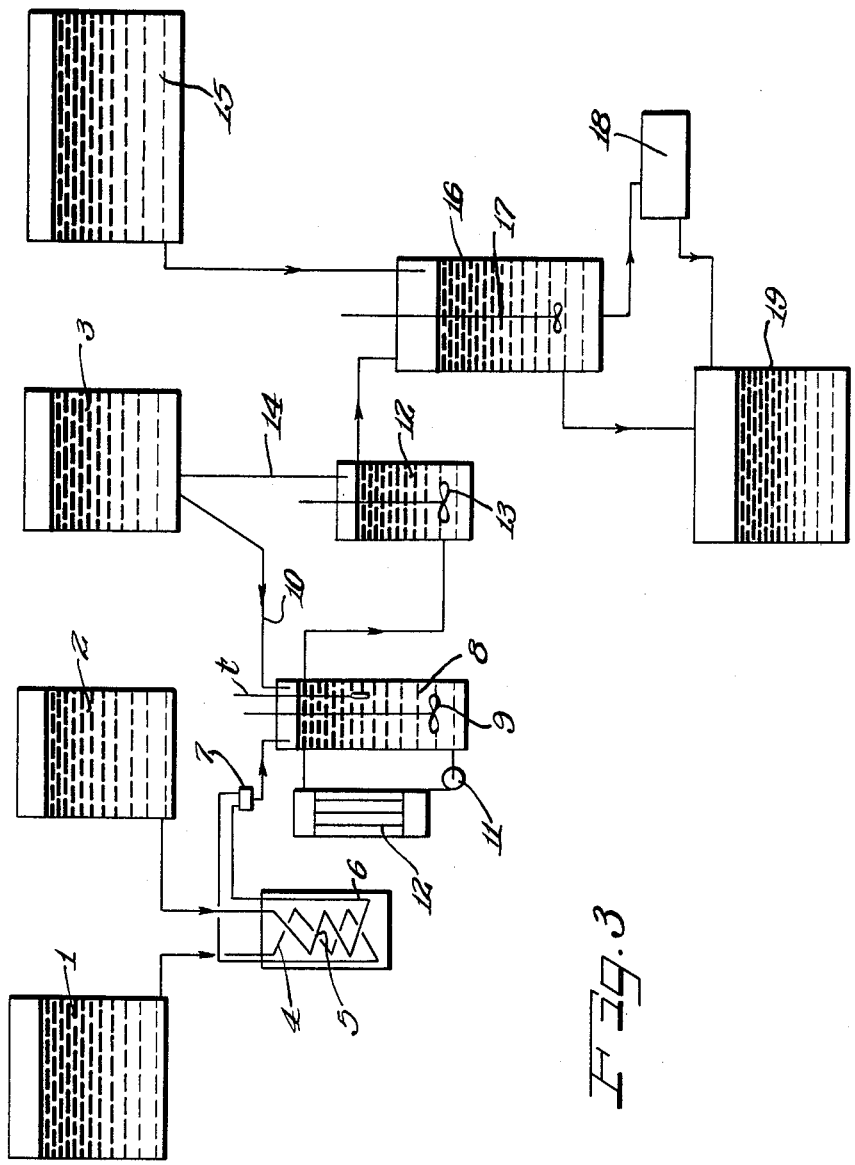

3,215,736
PREPARATION OF AMINO ACIDS

Henri Martin Guinot, Versailles, France, assignor of eighty percent to Societe de Produits Chimiques Industriels S.P.C.I., Seine, France, a company of France
Filed Mar. 20, 1964, Ser. No. 353,488
12 Claims. (Cl. 260—534)

This is a continuation-in-part of my application Serial No. 34,516, filed June 7, 1960, and now abandoned.

This invention relates to the preparation of amino acids, and more particularly to the production of alpha-amino-alkanoic acids by the amination of alpha-chloro or bromo-alkanoic acids.

The preparation of aminoacetic acid, or glycine, by the action of aqueous ammonia on monochloroacetic acid in accordance with the reaction:

$$Cl—CH_2—COOH + 2NH_3 \rightarrow NH_2—CH_2—COOH + NH_4Cl$$

has long been known and has been studied by many authors, all of whom agree in emphasizing the necessity of using a very large excess of ammonia over the theoretical quantity in order to obtain good yields.

Thus, Orten and Hill (J. Am. Chem. Soc. 53, 2797 (1931)) have proposed to react one molecular proportion of mono chloroacetic acid with an aqueous solution containing 60 molecular proportions of ammonia. The pure aminoacetic acid yield is then 64% of the theoretical. With a somewhat improved procedure, employing the same excess of ammonia, W. Tobie and G. B. Ayres (J. Am. Chem. Soc. 64, 725 (1942)) announced a yield of 75% to 77% of the theoretical value.

The undesirable production of derivatives polysubstituted on the nitrogen, such as acids having the formulae $NH—(CH_2—COOH)_2$ and $N(CH_2—COOH)_3$, prevented the obtaining of higher yields as did also the production of glycolic acid, $OH—CH_2—COOH$, which is unavoidably formed in a strongly alkaline medium.

By using mixtures with ammonia carbonate instead of pure ammoniacal solutions, it is possible to reduce from 60 to 10 the number of molecules of ammonia employed per molecule of chloroacetic acid, while improving the final yield. Thus, according to Cheronis and Spitzmuller (J. Org. Chem. 6, 373 (1941)), 84% of the theoretical yield is obtained by using such operating conditions.

In a different method of preparation Auger- (Bull. Soc. Chim. (3) 21, 6) described the reaction of ethyl chloroacetate, or better still potassium chloroacetate, with hexamethylenetetramine to give an addition product having the formula:

$$(CH_2)_6N_4—CH_2Cl—COOK$$

(see also Grignard, Traite de Chimie Organique, 13, 583, published by Masson). This addition product is decomposed by boiling it with a mixture of ethyl alcohol and hydrochloric acid to give formal and the ethyl ester of aminoacetic acid in accordance with the reaction:

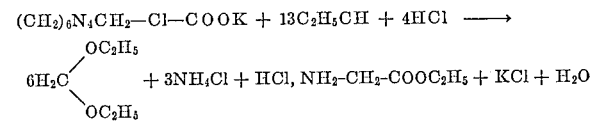

The formal, which is sparingly soluble in the solution, forms an upper layer and is separated off to recover the formaldehyde. The ethyl ester of aminoacetic acid is hydrolysed and then converted into the copper salt. By this means, Auger obtained a 71% yield of pure product.

Hillmann and Hillmann adopted this method (Z. Physiol. Chem. 283, 71 (1948)) and improved and generalized it. Like Auger they proceeded by way of the addition product, which they filtered off and thereafter decomposed by means of a boiling mixture of alcohol and hydrochloride acid. Under these conditions, employing a weight of hexamethylenetetramine equivalent to 3.5 times the weight of chloroacetic acid, they obtained a yield of 92%.

I have now found that glycine can be directly prepared in nearly theoretical yields from alpha-mono-chloro- or bromo-acetic acid by a straight amination reaction with ammonia in the presence of a source of hexamethylenetetramine, either hexamethylenetetramine, added as such, or formed in situ from a mixture of ammonia and formaldehyde in the molar ratio of 4:6, without the necessity of using a large excess of ammonia.

I have also found that by proceeding under similar conditions, it is possible to prepare in good yields the higher homologues of aminoacetic acid having up to six carbon atoms, more especially alpha-alanine and dl-valine, from the corresponding alpha-chloro and alpha-bromo alkanoic acids.

The invention therefore comprises a process for the production of an aliphatic alpha-amino-alkanoic acid which comprises effecting reaction in an aqueous type medium between the alpha-monochloro- or alpha-monobromo-alkanoic acids, as such, or as its ammonium salt, corresponding to the desired acid, hexamethylenetetramine and ammonia, the amounts of the reactants being such that the molecular ratio of the hexamethylenetetramine to the alpha-mono-halo-alkanoic acid is in the molar proportion of at least 0.02/1. The pH of the reaction mixture may be from 4 to 9.5, but is preferably from 4 to 8.

The hexamethylenetetramine may be employed in the form of ammonia and formaldehyde in reacting proportions. Generally speaking, instead of crystallized hexamethylenetetramine (urotropin), aqueous solutions obtained by mixing formaldehyde and ammonia are used, it being unnecessary for the respective proportions of the two reactants to be accurately adjusted. The formaldehyde solution may be first introduced into the reaction vessel as an initiator and the solutions of ammonium chloroacetate and of ammonia may thereafter be added at the desired rate for the correct development of the reaction.

Preferably the reaction takes place at a temperature of 40° to 90° C. and at a pH within the range of about 4 to 9.5, and most preferably at about 7.5.

Although it is possible to work in dilute aqueous solution, it is desirable with the lower molecular weight acids to work in a medium of minimum water content, because, since glycine, for example, is very water-soluble, it would otherwise thereafter be necessary to add very large quantities of alcohol in order to precipitate the acid, which is very sparingly soluble in alcohol of high concentration but notably more soluble in dilute alcohol.

The process of the invention is particularly well suited to the preparation of glycine from chloroacetic acid and in the description which follows chloroacetic acid is used as a typical starting material.

When an aqueous alcoholic reaction medium is used, the glycine begins to precipitate during the reaction. It is then possible to work with a lower concentration of the reactants than if the operation were carried out in a purely aqueous medium without any disadvantages regarding the isolation of the glycine.

The reaction proceeds as if formaldehyde were regenerated and then reacted with the added ammonia to form further hexamethylenetetramine, which in turn reacts, and so on. As represented in the following reaction, substantially all the chloroacetic acid can be converted by degrees into aminocetic acid in accordance with the reaction:

These equations explain why a relatively small quantity of hexamethylenetetramine is sufficient.

Instead of ammonium monochloroacetate or of monochloroacetic acid and ammonia, it is possible to employ as starting material ammonium monobromoacetate or monobromoacetic acid and ammonia. The yield is still very good, although smaller than with chloro compounds, which are therefore preferred, especially since they are at present less costly.

The process is applicable only to alpha-halo-substituted-alkanoic acids. Thus, B-chloropropionic acid, Cl—CH$_2$—CH$_2$COOH, treated as hereinbefore described, gives only an insignificant yield of B-alanine,

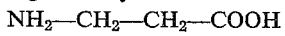

while alphachloropropionic acid gives alpha-alanine,

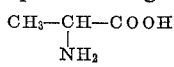

in a yield of 74%.

It should be noted that it is very disadvantageous to use alkali metal alkanoic acid salts, such as the alkali metal monochloroacetates instead of ammonium monochloroacetate.

It should also be noted that if the amination reaction were carried out by using only the theoretical quantity of ammonia, without the use of hexamethylenetetramine (or mixtures of formaldehyde and ammonia which are capable of producing hexamethylenetetramine), little or none of the expected amino acid would be obtained. By carrying out the amination with ammonia in the presence of hexamethylenetetramine in accordance with my invention, however, good yields of the alpha-amino-alkanoic acid are obtained by the use of only the theoretical amount of ammonia required for the reaction, plus such excess of ammonia as may be required to maintain the pH of the reaction mass within the range of 4 to 8, but not over 9.5, during the carrying out of the reaction. As will be pointed out hereinafter, the pH value of 9.5 is approximately the maximum pH that is reached when hexamethylenetetramine is used in accordance with my invention, even when a large, and therefore unnecessary excess of ammonia is employed.

It is therefore an important object of this invention to provide an economical process for the preparation of amino acids that results in a very considerable saving in the amount of ammonia used as compared with prior art methods, and that results directly in the obtaining of the amino acids in good yields and in a relatively high state of purity.

Other and further important objects of this invention will become apparent from the following description and appended claims.

For the preparation of a C$_2$—C$_6$ alpha-amino-alkanoic acid, the corresponding alpha-chloro-alkanoic acid or alpha-bromo-alkanoic acid, or an ammonium salt thereof, is employed as starting material. It is feasible, for example, to start with an aqueous dispersion of the alpha-chloro-alkanoic or alpha-bromo-alkanoic acid and hexamethylenetetramine, bring the mixture approximately to neutrality by adding ammonia and then heat it initially to a temperature of around 50° C. while adding the required quantity of ammonia in order to obtain a pH in the range from 4 to 8, so as to bring about the formation of the desired alpha-amino-alkanoic acid.

Generally speaking, the aminating reaction according to the present invention starts at room temperature, but it is very slow. It is greatly accelerated when carried out at higher temperatures, and the examples show that it can be completed in a very short time at temperatures in the neighborhood of 75° C. Since secondary reactions occur, the most favorable temperature is sought for accelerating the main reaction, while decelerating, or accelerating to a lesser degree, the secondary reactions. Experience shows that this temperature is generally in the neighborhood of from 50° to 80° C., but this does not mean that it is necessarily desirable to operate in this temperature range in all cases, as for example in the case of more unstable bromo derivatives.

At the end of the reaction, a water miscible organic solvent is added to cause the precipitation of the acid. Methanol, ethanol or acetone or mixtures of these may be added and the precipitated amino acid removed from the reaction mixture as by filtration.

The unchanged hexamethylenetetramine may be recovered, after removal of the amino acid, for example by treating the mother liquor with a suitable ion exchange resin to remove the ammonium chloride formed or by evaporating off any organic solvent, adding sufficient sodium hydroxide to decompose the ammonium chloride, concentrating the solution and removing the sodium chloride formed by treatment with an ion exchange resin or by adding a diluent which causes the precipitation of the sodium chloride, such as methanol, and removing the precipitated sodium chloride.

I have found in addition that it is possible to make the process continuous without any reduction in yields and with an appreciable increase in the speed of reaction. These results arise out of my investigation into the kinetics of the aminating reaction of alpha-halo acids. I have found that the speed of the aminating reaction is closely tied to the temperature.

If, for example, an aqueous ammonia solution is added to an aqueous solution of ammonium chloroacetate and hexamethylenetetramine, at a speed such that the pH of the mixture is maintained at about 7, it is found that for complete amination of the chloroacetic acid the reaction times vary with the temperature in the following manner:

At a temperature of 16° C., at least 400 hours are required for a complete reaction:

at 200° C. only 100 hours are required
at 30° C. only 21 hours are required
at 35° C. only 10½ hours are required
at 42° C. only 4¾ hours are required
at 50° C. only 2 hours are required
at 70° C. only 1 hour is required
at 75° C. only 20 minutes are required.

Above this last-mentioned temperature, the reaction takes place as if the formaldehyde complex were very much more highly activated and a complete reaction can be obtained in a few minutes.

The present invention therefore includes a continuous process wherein the reactants are fed continuously to a reaction zone maintained at a temperature of at least about 75° C. and the product is continuously removed.

Preferably the residence time in the reaction zone is adjusted to the value required to obtain a substantially maximum degree of conversion into amino acid.

For maintaining the temperature in the reaction zone, it is advantageous to divide the latter into a main section of large capacity and a circuit of smaller capacity, the latter comprising a cooling device having a high coefficient of heat exchange and a pumping device intended to pass the mixture taken from the main section through the circuit and to return it into the said main section.

The degree of conversion into amino acid in the reaction zone is obviously limited to a value controlled by the continuous arrival of the alpha-halo-alkanoic acid. For this reason, less than the quantity of ammonia necessary for effecting the amination can be introduced into the reaction zone proper, and the rest of the ammonia can be introduced into the effluent which leaves this zone in order to ensure conversion of any of the alpha-halo-alkanoic acid compound which has not yet reacted.

In the accompanying drawings which will serve to illustrate certain principles and features of my invention:

FIGURE 1 is a chart illustrating the relationship between the molar ratio of hexamethylenetetramine (HMT) and monochloroacetic acid (MCA) and the percent (%) yield of glycine, both that obtained as a crude yield and that obtained after a single recrystallization of the glycine from the crude;

FIGURE 2 is a chart illustrating the effect of the pH during the carrying out of the amination reaction upon the percent yield of glycine; and FIGURE 3 is a diagrammatic illustration of the equipment used in carrying out the continuous process of my invention for the production of glycine.

As shown on the drawings:

With reference first to FIGURE 3, tanks 1, 2 and 3 contain, respectively, an ammonium chloroacetate solution, a solution obtained by neutralizing to a pH 7 an aqueous 30% formaldehyde solution with ammonia, and a concentrated aqueous ammoniacal solution containing 14 moles of $NH_3$ per liter.

The solutions of ammonium chloroacetate and formaldehyde are run into coils 4 and 5 immersed in a water bath 6 heated to 80° C. The two solutions are separately heated to about this temperature. They are then combined in a mixer 7 and forwarded to a reaction vessel 8 provided with a screw-type stirrer 9, in which they are intimately mixed. However, the previous heating of the two solutions is not essential and the two solutions may in fact be introduced while cold into the reaction vessel, and there brought to the appropriate temperature.

The reaction starts immediately upon mixing in the vessel 8 and the mixture immediately becomes acid. The pH value of the mixture is maintained by adding, at the required rate, ammoniacal solution from tank 3 through pipe 10.

Since the reaction evolves heat (about 25 calories per mol), it is usually necessary to provide for cooling the reaction mass. A portion of the liquid is withdrawn from the reaction vessel and circulated by means of a pump 11 through a cooler 12, preferably of the plate type, which has the advantage that it has a high coefficient of heat exchange for a low liquid content. The speed of circulation of the liquid through the cooler is then so adjusted as to maintain in the reaction vessel 8 a temperature of 85° C., as measured by the thermometer $t$.

The capacity of the assembly comprising the reaction vessel 8 and the circuit including the cooler 12 is such that all three feed liquids remain for 4 to 5 minutes at this temperature of 85° C.

Of course, if the reaction temperature chosen were lower, it would be necessary to extend the residence time in the reaction zone accordingly. For example, at a temperature of 75° C., the liquid mixture would need to remain in the vessel for 8 to 20 minutes, but the principle would remain the same.

The liquid thereafter overflows from the vessel 8 into a finishing vessel 12 provided with a stirrer 13, into which latter vessel an additional quantity of ammonia is introduced through pipe 14 to complete the reaction.

Finally, the solution overflows from the finishing vessel 12. It is thereafter treated in order to recover the glycine acid by known means, for example by the addition of 2 to 3 times its volume of methanol (coming from a tank 15) in a vessel 16 provided with a stirrer 17 to promote the crystallization of the glycine. The crystalline mass collected at the bottom of the vessel 16 is sent to a filtering station 18, while the mother liquor emanating directly from the tank 16 and that recovered during the filtration at 18 are collected in a tank 19 in order to be distilled.

The continuous process and the apparatus hereinbefore described can be used in the preparation of other $C_2$—$C_6$ alpha-amino-alkanoic acids, as indicated at the beginning of the present description.

Gaseous ammonia may be employed to effect the aminating reaction without departing fdom the scope of the present invention. This procedure makes it possible to work with more highly concentrated solutions, but on the other hand necessitates a more vigorous cooling.

The following examples illustrate batch processes carried out in accordance with my invention:

*Example I*

Into a spherical flask provided with a stirrer, a thermometer dipping into the liquid and a neck for the admission of the reactants there was introduced 105 gms. (0.75 mol) of hexamethylenetetramine and 105 gms. of water.

Separately and simultaneously there were introduced into the flask with vigorous agitation and cooling, on the one hand an aqueous monochloroacetic acid solution obtained by dissolving 5 mols of chloroacetic acid, i.e., 492.5 gms. of commercial acid having a purity of 96%, in one-third of its weight of water (164 gms.), and on the other hand 520 cc. of an aqueous ammonia solution (28° Be.) intended to provided a quantity of $NH_3$ sufficient to neutralize the chloroacetic acid and to assist amination thereof.

The monochloroacetic acid solution was added regularly and continuously in such manner that the addition was completed in about 2 hours. The addition of the ammoniacal solution was accordingly so adjusted as to maintain the reaction mixture at a constant pH value in the neighborhood of 6. Failing a pH meter, there may be used for this purpose an indicator such as bromocresol violet, which turns yellow at pH 5 and becomes violet at pH 6.8.

As soon as the reactants have been introduced into the hexamethylenetetramine solution, the temperature tends to rise rapidly and the solution tends to become acid. The temperature was maintained in the neighborhood of 75°–80° C. by external cooling and the ammoniacal solution was added to maintain the pH at the desired value.

When the addition of the reactants was complete, the temperature was allowed to fall below the boiling point of the methanol and, with continued agitation, 5 liters of methanol were gradually added, the crystallization of the aminoacetic acid taking place instantly. The mixture was well cooled and the crystals obtained were filtered and dried.

A first fraction of 346 gms. of glycine was obtained, the purity of which was 98.5% and which contained less than 0.12% of ammonium chloride. The yield was 92% of the theoretical yield. By slightly concentrating the aqueous liquor in vacuo before the addition of methanol and increasing the volume of the latter a little in order to promote the precipitation of the glycine, a slightly higher yield can be obtained, but the ammonium chloride content of the crude product may also be increased.

*Example II*

A concentrated solution of hexamethylenetetramine was prepared in advance by saturating 360 kg. of 30% aqueous solution of formaldehyde with gaseous ammonia.

Into this solution, heated at 60–70° C. and vigorously agitated, were slowly poured 400 kg. (4,230 mols) of monochloroacetic acid dissolved in 120 liters of water. Gaseous ammonia was simultaneously introduced into the reaction vessel so as to maintain the pH value of the liquid at about 7. The mixture was cooled in order to eliminate the reaction heat and the speed of addition of chloroacetic acid was controlled to maintain the temperature between 60° and 70° C. The duration of the reaction was 6 hours. Thereafter, 100 liters of water were added to the liquid, which has maintained for a further hour at about 60–70° C.

The liquid was transferred into a precipitation vessel provided with a stirring and cooling device, and 140 liters of water and 1300 liters of methanol were then added. The mixture was cooled with agitation and maintained for one hour at about 15–20° C. After filtration, the product was washed in two stages with 200 liters of methanol and dried. 290 kg. (3.875 mols) of glycine having a purity of 99.5% were obtained, i.e. a yield of 91.5%).

On crystallization from water, preceded by passage over charcoal, a product was obtained which had the purity required by the Codex (the French Pharmacopoeia) in a recrystallization yield of 98%.

*Example III*

The procedure of Example I was followed, but half the quantity of hexamethylenetetramine was employed, i.e. 0.375 mol of hexamethylenetetramine to 5 mols of monochloroacetic acid. The yield obtained was about 89%.

*Example IV*

The procedure of Example I was followed, but 150 gms. of hexamethylenetetramine were employed, i.e. 1.07 mols of hexamethylenetetramine to 5 mols of monochloroacetic acid. In this case, the crude yield was in the neighborhood of 94–95% of the theoretical value.

*Example V*

Into a spherical flask provided with a stirrer were introduced 52.2 gms. of alpha-chloropropionic acid (0.48 mols), 14 gms. of hexamethylenetetramine (0.10 mols) and 30 cc. of water. The mixture was neutralized by a 28% ammonia solution until it produced a change in the color of bromocresol violet, which occurs at pH 6.8; this required 31 cc. of the ammonia solution. The temperature was then raised to 70° C., and sufficient gaseous ammonia added to maintain the pH at about 6.8. The reaction was complete when it was found on volumetric titration with silver nitrate that all of the halogen, in the present case chlorine, of the initial acid had been changed to the ionic state in which it can combine with silver. The reaction lasted 3 hours 30 minutes. When the heating was stopped and the product had been slightly cooled, 20 cc. of water and 500 cc. of methanol were introduced, and the product was allowed to crystallize with cooling. After filtration, washing and drying of the precipitate, a weight of 31.6 gms. of alpha-alanine was obtained, which corresponds to a yield of 74%.

*Example VI*

Into a spherical flask provided with a stirrer were introduced:

45 gms. of alpha-bromoisovaleric acid (0.248 mols)
9 gms. of hexamethylenetetramine (0.064 mols)
12 cc. of water The mixture was neutralized to bromocresol violet by passing ammonia through the agitated mixture. It was then heated to about 55° C. and a 28% ammonia solution was gradually added so as to maintain the solution at about pH 6–6.5. The reaction lasted 26 hours. Towards the end of the reaction, the temperature was progressively raised to about 70° C. After cooling, 20 cc. of water and 250 cc. of methanol were added. After crystallization, filtration, washing and drying, there were recovered 19.7 gms. of dl-valine, corresponding to a yield of 68.2% of the theoretical yield.

With more particular reference to FIG. 1, this chart shows that an almost maximum yield of glycine is obtained at a ratio of hexamethylenetetramine (HMT) to monochloroacetic acid (MCA) of about 0.15/1. At that point the crude yield is about 90%, as shown by the full line curve, and the yield after recrystallization is about 84%, as shown by the dash line curve. Except for varying the ratio of HMT to MCA, the conditions of the test experiments from which the data for the curves of FIG. 1 were obtained were substantially those of Example I hereinabove, maintaining the temperature during reaction at about 75° C.

These curves, then, clearly show that there is no significant gain in yield of glycine to be expected from increasing the HMT/MCA ratio above about 0.15/1. The use of larger proportions of HMT than about 0.15/1 is largely a safety factor. There is no maximum ratio of HMT/MCA that must not be exceeded, although for economic reasons the ratio should be less than 1/2 and preferably kept at about 0.075/1. In terms of formaldehyde to monochloroacetic acid, the molar ratio should be less than 6/2 and preferably not less than 0.9/2, where formaldehyde is used for reaction with ammonia to form hexamethylenetetramine in situ.

The curves also show that even with as low a ratio of HMT/MCA as 0.02/1, a substantial yield, in the neighborhood of 45%, can be obtained. This ratio of 0.02/1 is thus about the lower limit for all practical purposes.

The chart of FIG. 2 illustrates the effect of varying the pH of the reaction mass upon the yield of glycine. In collecting the data for the curves of this chart (FIG. 2), the reaction was carried out successively in a number (6) of batch operations, while maintaining the pH during the reaction at as near a constant (but different value) for each batch as possible but keeping the other conditions of Example I constant. The full line curve shows the crude yield, as obtained by precipitation of the glycine directly from the reaction mass, and the dash line curve shows the yield of recrystallized glycine obtained from the first crystallization step. As in FIG. 1, yields are calculated in terms of pure glycine. The monochloroacetic acid used in obtaining the data for both charts was assumed to be 100% pure, but was furnished by the manufacture as of 98% or higher purity.

The curves of FIG. 2 show that approximately maximum yields of glycine are obtained under the conditions employed over the range of from about 5.5 to 8 pH, but that only slightly lower yields are obtained at as low as 4.0 pH and at as high as 9.0 pH. Beyond a pH of about 9, the yield falls off sharply. It is interesting to note, however, that with further excess amounts of ammonia (over the amount required for optimum pH and maximum yield of glycine), the pH does not tend to exceed the maximum pH of 9.5 represented by the vertical dash line of FIG. 2. This maximum pH value of about 9.5 is reached by the use of about two (2) times the amount of ammonia theoretically required for the amination of MCA to glycine. Even with greater proportions of ammonia than represented by this 100% excess over theoretical, the pH does not rise appreciably above 9.5, probably due to the buffering action of the ammonium chloride and other components of the reaction mass.

From the curves of FIGS. 1 and 2 it is thus evident that maximum yields of glycine can be obtained by the amination of monochloroacetic acid in the presence of hexamethylenetetramine by maintaining the ratio of HMT/MCA at about 0.15/1 and by maintaining the pH during reaction at about 5.5 to 8. The maintenance of the pH between these limits can be accomplished simply by properly adjusting the proportion of ammonia used in carrying out the reaction and thus avoiding the use of excessive and uneconomic amounts of ammonia.

While the charts of FIGS. 1 and 2 are based upon the amination of monochloroacetic acid to produce glycine, a similar relationship between the various reactants exists in the amination of other alpha-halo-alkanoic acids to produce the corresponding alpha-amino-alkanoic acids containing from three to six carbon atoms, inclusive.

The $C_3$–$C_6$ alpha amino-alkanoic acids intended to be included within the scope of this invention include the following:

alpha alanine, L-alpha-aminopropionic acid,
dl valine, alpha-aminoisovaleric acid, and
leucine, or alpha-aminoisocaproic acid.

It will be understood that modifications and variations may be effected without departing from the scope of the novel concepts of the present invention.

I claim as my invention:

1. In a process for the production of a $C_2$–$C_6$ alpha-amino alkanoic acid by amination of an alpha mono-halo compound selected from the group consisting of $C_2$–$C_6$ alpha-monochloro- and alpha-mono-bromo-alkanoic acids and ammonium salts thereof and where the amination is effected in an aqueous type medium by means of ammonia, the improvement whereby a considerable saving in ammonia can be realized over using ammonia alone, which comprises carrying out said amination in the presence of hexamethylenetetramine in a molar relation to said alpha-halo-alkanoic acid compound to be reacted of at least 0.02/1.

2. The process of claim 1 in which the alpha-halo-alkanoic acid compound is alpha monochloroacetic acid and the amino-alkanoic acid is glycine.

3. The process of claim 1 in which the amination reaction is carried out in the presence of at least 0.075 mol of hexamethylenetetramine per mol of the alpha-halo-alkanoic acid and the hexamethylenetetramine is provided by the reaction in situ of formaldehyde and ammonia.

4. The process of claim 2 in which the monochloroacetic acid and ammonia are reacted in the presence of formaldehyde and an excess of ammonia over that theoretically necessary to effect said amination, the excess being sufficient during the reaction to maintain the pH of the reaction mass at a pH of between 4 and 8, but not over 9.5, and to maintain the stated minimum molar ratio of 0.02/1 of hexamethylenetetramine to the alpha-monochloroacetic acid used.

5. A process for the production of a $C_2$–$C_6$ alpha-amino-alkanoic acid which comprises reacting together in an aqueous type medium at a temperature in the range of 40–90° C., an alpha mono-halo compound selected from the group consisting of $C_2$–$C_6$ alpha-monochloro- and alpha-mono-bromo-alkanoic acids and ammonium salts thereof, ammonia and a source of hexamethylenetetramine, the total ammonia present being sufficient for the theoretical conversion of said alpha-mono-halo compound into the corresponding $C_2$–$C_6$ alpha-amino-alkanoic acid, for the maintenance of said hexamethylenetetramine in the molar proportion of at least 0.02 mol/1 of said alpha-mono-halo compound reacted and for maintenance of the reaction mass during the carrying out of said reaction at a pH of from 4 to 8, but not over 9.5.

6. A process as defined by claim 5, wherein the alpha-mono-halo compound is alpha monochloroacetic acid and the alpha-amino alkanoic acid is glycine.

7. A process as defined by claim 6, wherein the molar proportion of said hexamethylenetetramine to said alpha mono-halo compound is at least 0.075/1.

8. A process for the production of a lower alpha-amino-alkanoic acid, which comprises reacting together in an aqueous medium at a temperature in the range of 40–90° C. an alpha mono-halo compound selected from the group consisting of $C_2$–$C_6$ alpha-monochloro- and alpha-mono-bromo-alkanoic acids and ammonium salts thereof, formaldehyde and ammonia, the amounts of the reactants being such that the molecular ratio of the formaldehyde to said halogenated compound is less than 6:2 and not less than 0.9:2, and the total amount of ammonia is only sufficient for the theoretical conversion of said halogenated compound into the corresponding lower alpha-amino-alkanoic acid, for the theoretical conversion of the formaldehyde present into hexamethylenetetramine and for maintaining the reaction mixture during the carrying out thereof at a pH of from 4 to 8.

9. The process of claim 8, said formaldehyde and a portion of said ammonia corresponding to a molecular proportion of 4:6 with respect to formaldehyde being present in combined form as hexamethylenetetramine.

10. The process of claim 8, which comprises the subsequent step of adding a diluent selected from the group consisting of methanol, ethanol and acetone to cause precipitation of the lower alpha-amino-alkanoic acid, and removing the so-precipitated acid.

11. A process for the continuous production of a lower alpha-amino-alkanoic acid, which comprises feeding to a reaction zone an aqueous solution of an alpha mono-halo compound selected from the group consisting of $C_2$–$C_6$ alpha-monochloro- and alpha-mono-bromo-alkanoic acids and ammonium salts thereof, an aqueous solution of formaldehyde and an aqueous solution of ammonia, the amounts of the reactants being such that the molecular ratio of the formaldehyde to said halogenated compound is less than 6:2 and not less than 0.9:2, and the total amount of ammonia is only sufficient for the theoretical conversion of said halogenated compound into the corresponding lower alpha-amino-alkanoic acid, for the theoretical conversion of the formaldehyde present into hexamethylenetetramine and for maintaining the reaction mixture during the carrying out thereof at a pH of from 4 to 8.

12. The process as defined by claim 11, wherein the lower alpha-amino-alkanoic acid is aminoacetic acid and the halogenated compound is alpha monochloroacetic acid.

References Cited by the Examiner
UNITED STATES PATENTS 2,225,155  12/40  Cheronis _____ 260—534
2,805,254  9/57   Nicolaisen _____ 260—585

OTHER REFERENCES

Fieser: Organic Chemistry, (1950) pp. 215–16; 961.

LORRAINE A. WEINBERGER, *Primary Examiner.*

UNITED STATES PATENT OFFICE
CERTIFICATE OF CORRECTION

Patent No. 3,215,736                            November 2, 1965

Henri Martin Guinot

It is hereby certified that error appears in the above numbered patent requiring correction and that the said Letters Patent should read as corrected below.

Column 1, line 40, for "ammonia" read -- ammonium --; column 2, line 2, for "hydrochloride" read -- hydrochloric --; line 69, for "aminocetic" read -- aminoacetic --; lines 69 and 70, after "reaction:" insert the following:

$$2(CH_2)_6N_4 + 4\ ClCH_2COOH + 12\ H_2O \longrightarrow$$

$$4NH_2CH_2COOH + 4\ NH_4Cl + 12\ HCHO$$

$$12\ HCHO + 8\ NH_3 \longrightarrow 2\ (CH_2)_6N_4 + 24\ H_2O$$

column 4, line 33, for "200° C." read -- 20° C. --; column 5, line 69, for "fdom" read -- from --; column 8, line 16, for "(but different value)" read -- (but different) value --.

Signed and sealed this 16th day of August 1966.

(SEAL)
Attest:

ERNEST W. SWIDER                            EDWARD J. BRENNER
Attesting Officer                            Commissioner of Patents